(12) United States Patent
Ishikawa

(10) Patent No.: US 10,834,046 B2
(45) Date of Patent: Nov. 10, 2020

(54) INFORMATION PROCESSING APPARATUS WITH COMMUNICATION LINES, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Akira Ishikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 16/207,443

(22) Filed: Dec. 3, 2018

(65) Prior Publication Data
US 2019/0182206 A1    Jun. 13, 2019

(30) Foreign Application Priority Data

Dec. 8, 2017  (JP) ................................. 2017-236268

(51) Int. Cl.
*H04N 1/00* (2006.01)
*H04L 29/12* (2006.01)
*H04L 12/66* (2006.01)
*G06F 3/12* (2006.01)

(52) U.S. Cl.
CPC ........ *H04L 61/2015* (2013.01); *G06F 3/1209* (2013.01); *G06F 3/1231* (2013.01); *G06F 3/1254* (2013.01); *H04L 12/66* (2013.01); *H04N 1/00244* (2013.01)

(58) Field of Classification Search
CPC . H04L 61/2015; H04L 12/66; H04L 61/3025; H04L 61/2046; G06F 3/1254; G06F 3/1231; G06F 3/1209; G06F 3/1292; G06F 3/1236; G06F 3/1286; H04N 1/00244
See application file for complete search history.

(56) References Cited

U.S. PATENT DOCUMENTS

| 2007/0076237 A1* | 4/2007 | Kudo | ................... G06F 3/1204 358/1.13 |
| 2013/0326086 A1* | 12/2013 | Hamachi | ............. H04L 61/2007 709/245 |

FOREIGN PATENT DOCUMENTS

JP    2003319461 A    11/2003

* cited by examiner

*Primary Examiner* — Moo Jeong
(74) *Attorney, Agent, or Firm* — Rossi, Kimms & McDowell LLP

(57) ABSTRACT

An information processing apparatus that is capable of setting suitable IP addresses to a plurality of communication lines. A setting unit sets up IP addresses of the plurality of communication lines. A detection unit detects a use situation of an allocation function of the setting unit that allocates an IP address consisting of a predetermined network address. A decision unit decides whether the allocation function is used for setting an IP address of a communication line other than a predetermined communication line according to the use situation of the allocation function for setting an IP address of the predetermined communication line that is detected by the detection unit.

8 Claims, 18 Drawing Sheets

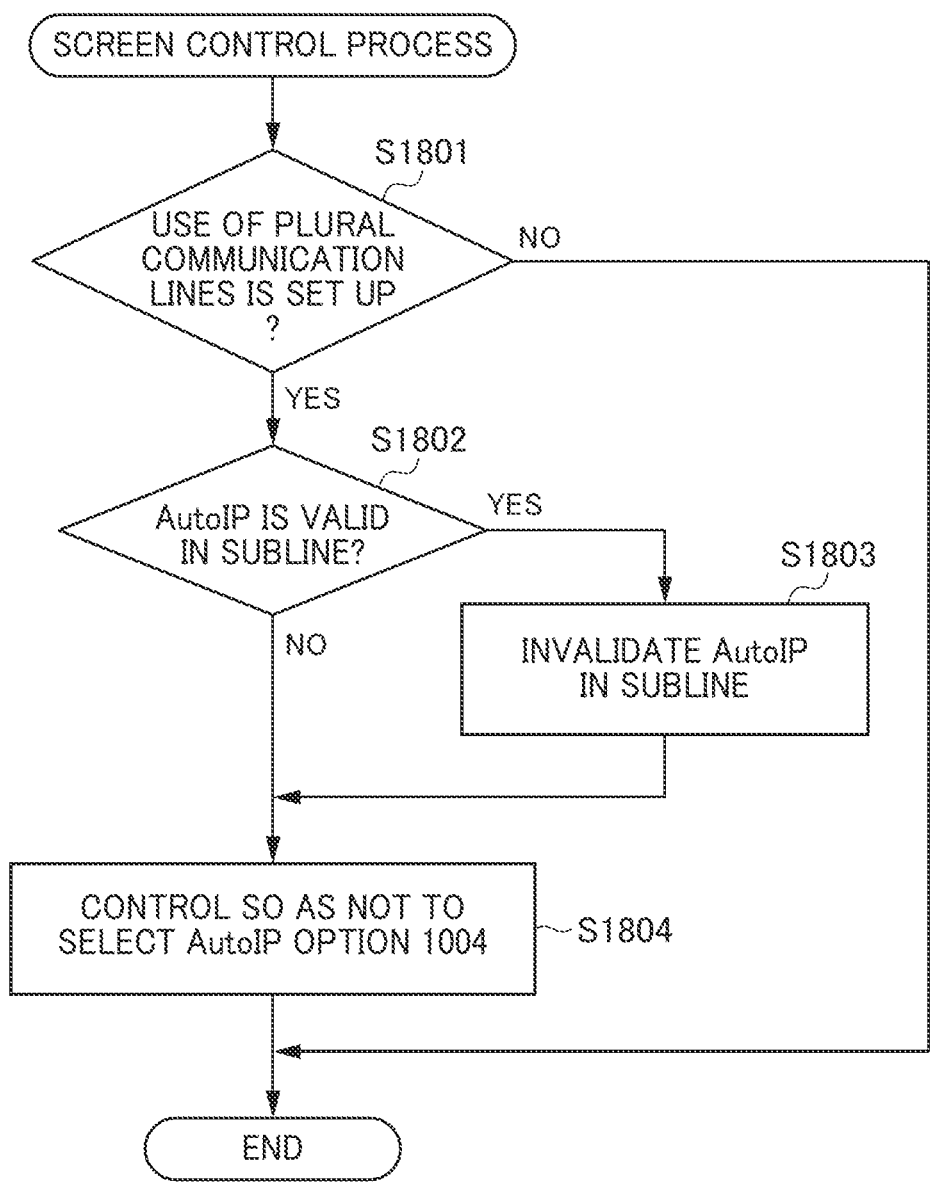

INFORMATION PROCESSING APPARATUS WITH COMMUNICATION LINES, CONTROL METHOD THEREFOR, AND STORAGE MEDIUM STORING CONTROL PROGRAM THEREFOR

BACKGROUND OF THE INVENTION

Field of the Invention

The present invention relates to an information processing apparatus with a plurality of communication lines, a control method therefor, and a storage medium storing control program therefor.

Description of the Related Art

In an office or commercial establishment, a plurality of LANs (Local area networks) are used properly. An information processing apparatus used in an office etc. is required to provide service to a plurality of LANs. In response to such a requirement, an information processing apparatus that is equipped with a plurality of communication interfaces is manufactured (see Japanese Laid-Open Patent Publication (Kokai) No. 2003-319461 (JP 2003-319461 A)). Such an information processing apparatus is provided with a plurality of communication lines, for example, and inherent IP addresses are set to the respective communication lines. Different communication interfaces are used for the respective communication lines at the time of communication. When performing data communication with a communication device, such an information processing apparatus specifies a communication line of the same network as the communication device from among a plurality of communication lines on the basis of a network address of the communication line that is specified by an IP address of the communication line, and decides to use the specified communication line for communication.

In an information processing apparatus equipped with a plurality of communication lines, IP addresses are allocated by a DHCP (Dynamic host configuration protocol) or an AutoIP (Automatic Private IP Addressing) so that the IP addresses of the communication lines do not overlap. An IP address allocated by the AutoIP is constituted on the basis of the predetermined network address "169.254.1.0" reserved by RFC3927. Accordingly, when the IP addresses allocated by the AutoIP are set to the communication lines, the network addresses of the communication lines overlap, and the information processing apparatus cannot decide a communication line to use at the time of data communication with a communication device. Against this, a conventional technique allows to use AutoIP to only one communication line among a plurality of communication lines.

However, when the use of the AutoIP is allowed to only one communication line as with the conventional technique, other communication lines cannot use the AutoIP even if the network addresses do not overlap. Accordingly, if acquisition of IP addresses allocated to the other communication lines by an allocation function (for example, the DHCP) other than the AutoIP has failed, suitable IP addresses that do not overlap with other communication devices cannot be set to the other communication lines.

SUMMARY OF THE INVENTION

The present invention provides an information processing apparatus, a control method therefor, and a storage medium storing a control program therefor, which are capable of setting suitable IP addresses to a plurality of communication lines.

Accordingly, a first aspect of the present invention provides an information processing apparatus equipped with a plurality of communication lines, the information processing apparatus including a setting unit configured to set up IP addresses of the plurality of communication lines, a detection unit configured to detect a use situation of a first allocation function of the setting unit that allocates an IP address consisting of a predetermined network address, and a decision unit configured to decide whether the first allocation function is used for setting an IP address of a communication line other than a predetermined communication line according to the use situation of the first allocation function for setting an IP address of the predetermined communication line that is detected by the detection unit.

Accordingly, a second aspect of the present invention provides a control method for an information processing apparatus equipped with a plurality of communication lines, the control method including a setting step of setting up IP addresses of the plurality of communication lines, a detection step of detecting a use situation of an allocation function in the setting step that allocates an IP address consisting of a predetermined network address, and a decision step of deciding whether the allocation function is used for setting an IP address of a communication line other than a predetermined communication line according to the use situation of the allocation function for setting an IP address of the predetermined communication line that is detected in the detection step.

Accordingly, a third aspect of the present invention provides a non-transitory computer-readable storage medium storing a control program causing a computer to execute the control method of the second aspect.

According to the present invention, suitable IP addresses are set to a plurality of communication lines.

Further features of the present invention will become apparent from the following description of exemplary embodiments with reference to the attached drawings.

BRIEF DESCRIPTION OF THE DRAWINGS

FIG. 18 is a flowchart showing procedures of a screen control process executed by an operation control module in FIG. 3.

DESCRIPTION OF THE EMBODIMENTS

Hereafter, embodiments according to the present invention will be described in detail with reference to the drawings. Although the embodiment describes a case where the present invention is applied to an MFP as an information processing apparatus, the present invention may be applied to communication devices, such as a PC equipped with a plurality of communication lines, other than the MFP.

Figure 1:
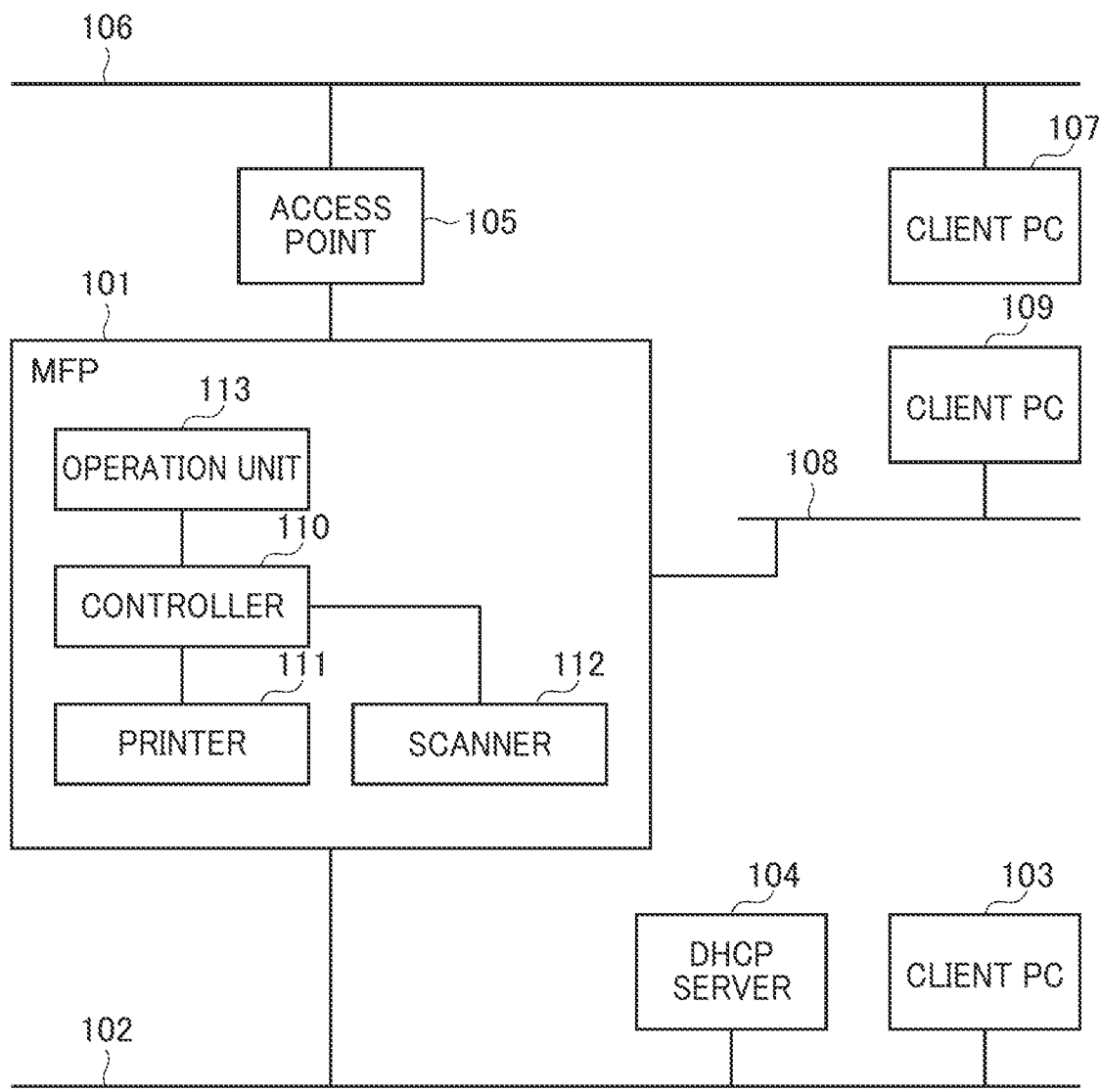
FIG. 1 is a block diagram schematically showing a configuration of an MFP as an information processing apparatus according to an embodiment of the present invention.

FIG. 1 is a block diagram schematically showing a configuration of an MFP 101 as an information processing apparatus according to an embodiment of the present invention.

As shown in FIG. 1, the MFP 101 is connected with a client PC 103 and a DHCP server 104 as communication devices that constitute a LAN 102 in a wired infrastructure through a wired cable (not shown). The MFP 101 communicates with the client PC 103 and the DHCP server 104 through the wired LAN. In the LAN 102, the DHCP server 104 allocates IP addresses to the MFP 101 and the client PC 103. For example, the client PC 103 accesses the MFP 101 by designating the IP address of the MFP 101 allocated by the DHCP server 104 and starts data communication with the MFP 101. Moreover, the MFP 101 communicates with a client PC 107 as a communication device that constitutes a LAN 106 in a wireless infrastructure through a wireless LAN via an access point 105 that is communicatively connected. Furthermore, the MFP 101 itself functions as an access point, and the MFP 101 directly communicates with a client PC 109 as a communication device that constitutes a LAN 108 through the wireless LAN.

The MFP 101 is equipped with a plurality of communication lines. The embodiment describes a configuration equipped with one main line and one subline as an example. Moreover, the MFP 101 is able to operate the wired infrastructure and wireless infrastructure simultaneously, either one of the wired infrastructure and wireless infrastructure is used as a main line and the other is used as a subline.

Next, the configuration of the MFP 101 will be described. The MFP 101 is equipped with a controller 110, a printer 111, a scanner 112, and an operation unit 113. The controller 110 is connected with the printer 111, scanner 112, and operation unit 113.

The controller 110 integrally controls the entire MFP 101. The printer 111 prints an image on a sheet on the basis of print data received from the communication device, such as the client PC 103, 107, and 109. The scanner 112 scans an original and generates image data. The operation unit 113 is provided with a display unit and a plurality of operation keys that are not shown. For example, the operation unit 113 displays an operation screen for various settings of the MFP 101 on the display unit and receives instructions input when a user operates the operation keys.

Figure 2:
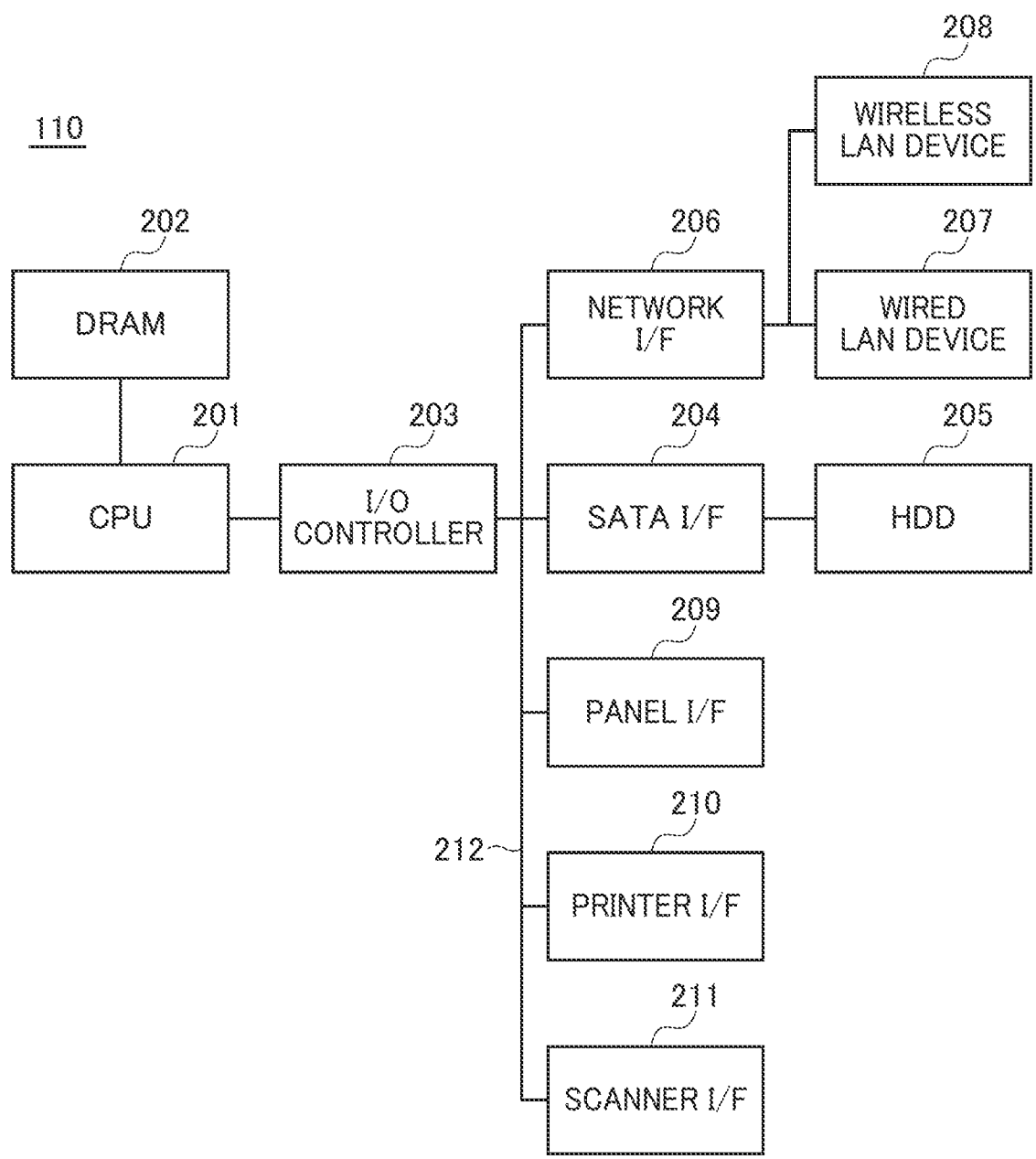
FIG. 2 is a block diagram schematically showing a configuration of a controller shown in FIG. 1.

FIG. 2 is a block diagram schematically showing a configuration of the controller 110 shown in FIG. 1.

As shown in FIG. 2, the controller 110 is provided with a CPU 201, a DRAM 202, an I/O controller 203, an SATA I/F 204, an HDD 205, a network I/F 206, a wired LAN device 207, and a wireless LAN device 208. Moreover, the controller 110 is provided with a panel I/F 209, a printer I/F 210, and a scanner I/F 211. The CPU 201 is connected with the DRAM 202 and the I/O controller 203. The I/O controller 203, SATA I/F 204, network I/F 206, panel I/F 209, printer I/F 210, and scanner I/F 211 are mutually connected through a bus 212. The SATA I/F 204 is connected to the HDD 205. The network I/F 206 is connected with the wired LAN device 207 and the wireless LAN device 208 that are communication interfaces.

The CPU 201 executes a calculation process for each control in the controller 110 and sends each control instruction to the I/O controller 203. The DRAM 202 is used as a working area of the CPU 201, and is used as a temporary storage area for data. The I/O controller 203 transfers a control instruction by the CPU 201 to each component connected through the bus 212. The SATA I/F 204 controls writing data to the HDD 205 and reading data stored in the HDD 205 according to the control instruction by the CPU 201. The HDD 205 stores programs, image data, etc. for achieving functions of the MFP 101.

The network I/F 206 is a transmission unit that controls each of the wired LAN device 207 and the wireless LAN device 208 according to the control instruction by the CPU 201. The wired LAN device 207 controls the wired LAN communication with the client PC 103 on the LAN 102. The wireless LAN device 208 has a wireless infrastructure mode and a wireless-access-point mode. In the wireless infrastructure mode, the MFP 101 performs the wireless LAN communication with the client PC 107 on the LAN 106 through the access point 105. In the wireless-access-point mode, the MFP 101 functions as an access point and performs wireless direct communication with the client PC 109 on the LAN 108. Hereinafter, the wireless communication in the wireless-access-point mode shall be wireless direct communication.

The panel I/F 209 controls display on the operation unit 113 according to the control instruction by the CPU 201 and transfers contents of instructions input by user's operation on the operation unit 113 to the CPU 201. The printer I/F 210 makes the printer 111 execute a print process according to the control instruction by the CPU 201. The scanner IF 211 makes the scanner 112 execute a scan process according to the control instruction by the CPU 201.

Figure 3:
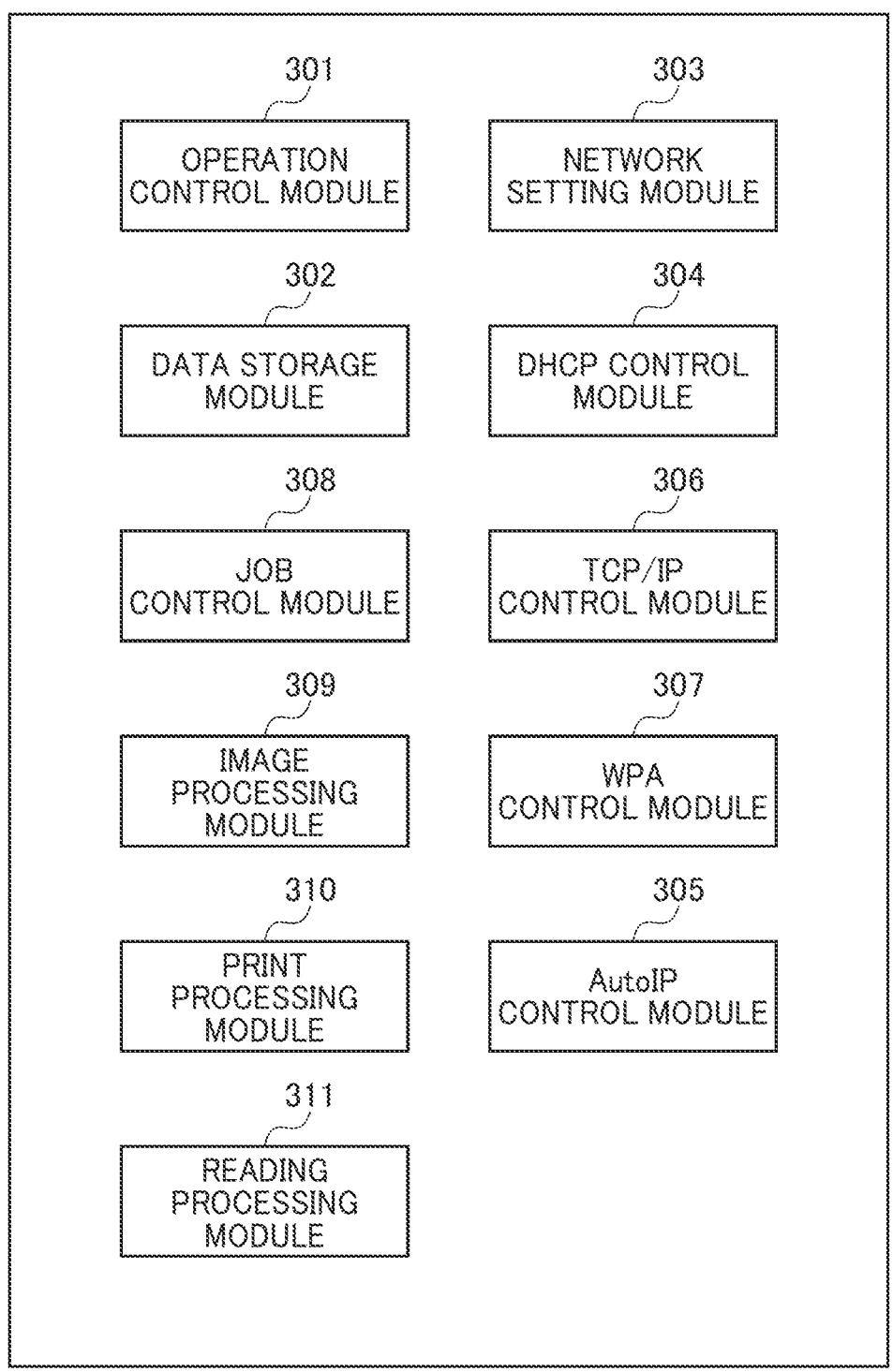
FIG. 3 is a block diagram schematically showing a configuration of software modules controlled by the controller shown in FIG. 1.

FIG. 3 is a block diagram schematically showing a configuration of software modules controlled by the controller 110 shown in FIG. 1.

As shown in FIG. 3, the MFP 101 is provided with an operation control module 301, a data memory module 302, a network setting module 303, a DHCP control module 304, an AutoIP control module 305, and a TCP/IP control module 306. Moreover, the MFP 101 is provided with a WPA (Wi-Fi Protected Access) control module 307, a job control module 308, an image processing module 309, a print processing module 310, and a reading processing module 311. The above-mentioned modules are achieved when the CPU 201 executes programs stored in the HDD 208.

The operation control module 301 controls display of the operation screen on the operation unit 113 and receives user's operations through the operation screen or the operation keys. The data memory module 302 controls writing data like setting values to the HDD 205 and controls reading data stored in the HDD 205. The network setting module 303 controls a network setting of the MFP 101 and requests the DHCP control module 304, AutoIP control module 305, and WPA control module 307 to execute respective processes. For example, the network setting module 303 requests the DHCP control module 304 to execute the process when a user instructs so as to set the IP address allocated by the DHCP server 104 as the address information about the MFP 101. Moreover, the network setting module 303 requests the AutoIP control module 305 to execute the process when the user instructs so as to set the IP address allocated by the AutoIP (a first allocation function) as the address information about the MFP 101.

The DHCP control module 304 controls an IP address allocation process according to the DHCP protocol defined by RFC2131. The AutoIP control module 305 controls an IP address allocation process according to the AutoIP protocol defined by RFC3927. The TCP/IP control module 306 performs a network-packet transmission/reception process. When receiving a request from the network setting module 303, the WPA control module 307 performs wireless-access authentication process according to a predetermined encryption method like the WPA protocol. Although the case where the WPA-PSK encryption method is used in the wireless LAN communication will be described in the embodiment, the encryption method is not limited to the above method. For example, other encryption methods, such as WEP and WPA-EAP, may be employed. Moreover, an encryption method may not be employed in the wireless LAN communication.

The job control module 308 controls execution of a job, and instructs execution of the processes relevant to the job to the image processing module 309, print processing module 310, and reading processing module 311. When receiving the execution instruction from the job control module 308, the image processing module 309 executes the image process. For example, the module 309 processes image data into a data format suitable for an intended use. When receiving the execution instruction from the job control module 308, the print processing module 310 controls the printer 111 to execute a print process. When receiving the execution instruction from the job control module 308, the reading processing module 311 controls the scanner 112 to execute a scan process.

Figure 4:
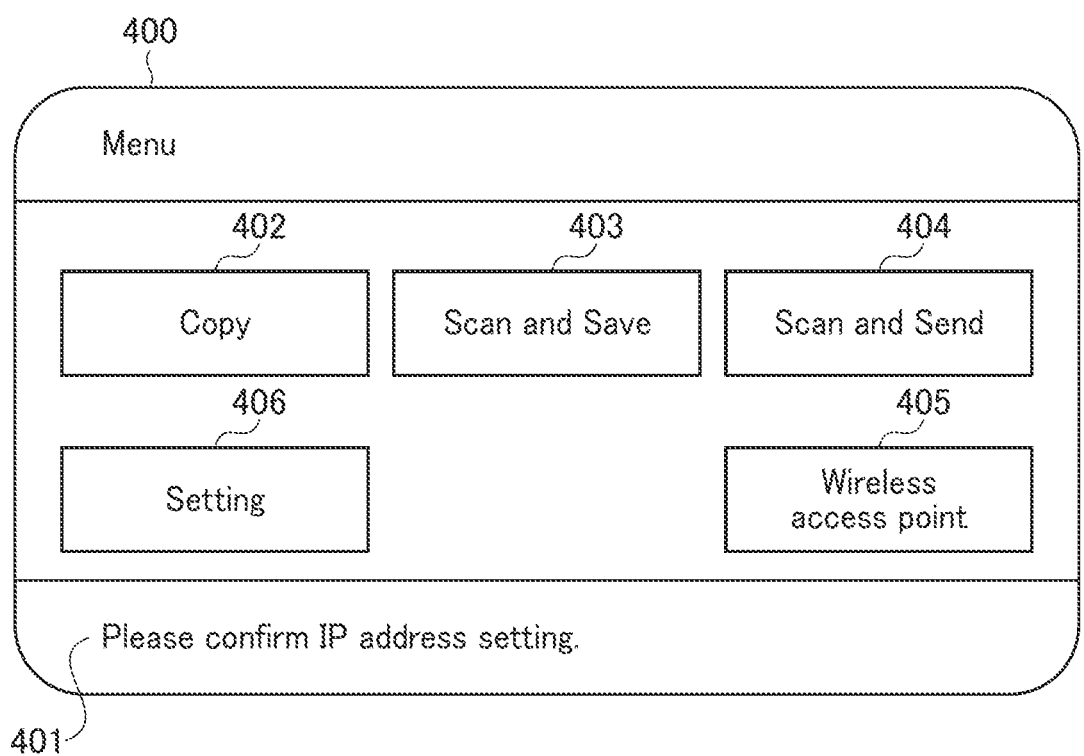
FIG. 4 is a view showing an example of a menu screen displayed on an operation unit shown in FIG. 1.

Next, a menu screen 400 in FIG. 4 displayed on the operation unit 113 will be described. The menu screen 400 is an operation screen on which the user selects each function of the MFP 101. The menu screen 400 includes an information notification area 401, a copy button 402, a scan-and-save button 403, a scan-and-send button 404, a wireless-access-point button 405, and a setting button 406. Various notifications for a user are displayed in the information notification area 401. The copy button 402 is selected when a user uses a copy function. The scan-and-save button 403 is selected when a user uses a function to save image data that the MFP 101 obtained by scanning. The scan-and-send button 404 is selected when a user uses a function to send image data that the MFP 101 obtained by scanning to a communication device. The wireless-access-point button 405 is selected when a user makes the MFP 101 shift to the wireless-access-point mode. The wireless-access-point button 405 is displayed on the menu screen 400, when a wireless-access-point-mode setting 1301 in FIG. 13 mentioned later is set as ON. When a user selects the wireless-access-point button 405, a start setting screen 500 in FIG. 5A mentioned later will be displayed on the operation unit 113. The setting button 406 is selected when a user changes each setting of the MFP 101. When a user selects the setting button 406 in the menu screen 400, a setting screen 600 in FIG. 6 mentioned later will be displayed on the operation unit 113.

Figure 5A:
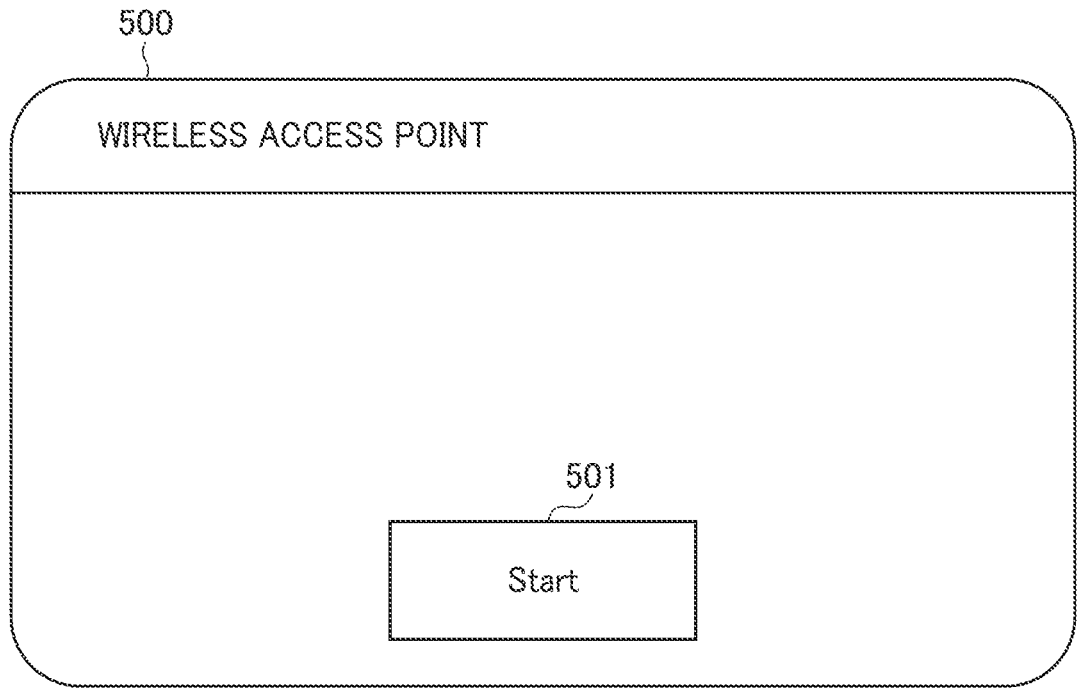
FIG. 5A is a view showing an example of a screen displayed for instructing start of a wireless-access-point mode in the MFP shown in FIG. 1.

The start setting screen 500 in FIG. 5A is a setting screen for instructing to start the wireless direct communication. When a user selects a start button 501 in the start setting screen 500, the network setting module 303 is instructed to start shifting to the wireless-access-point mode. Thereby, the MFP 101 operates as an access point and enables to start the wireless direct communication with the client PC 109.

Figure 5B:
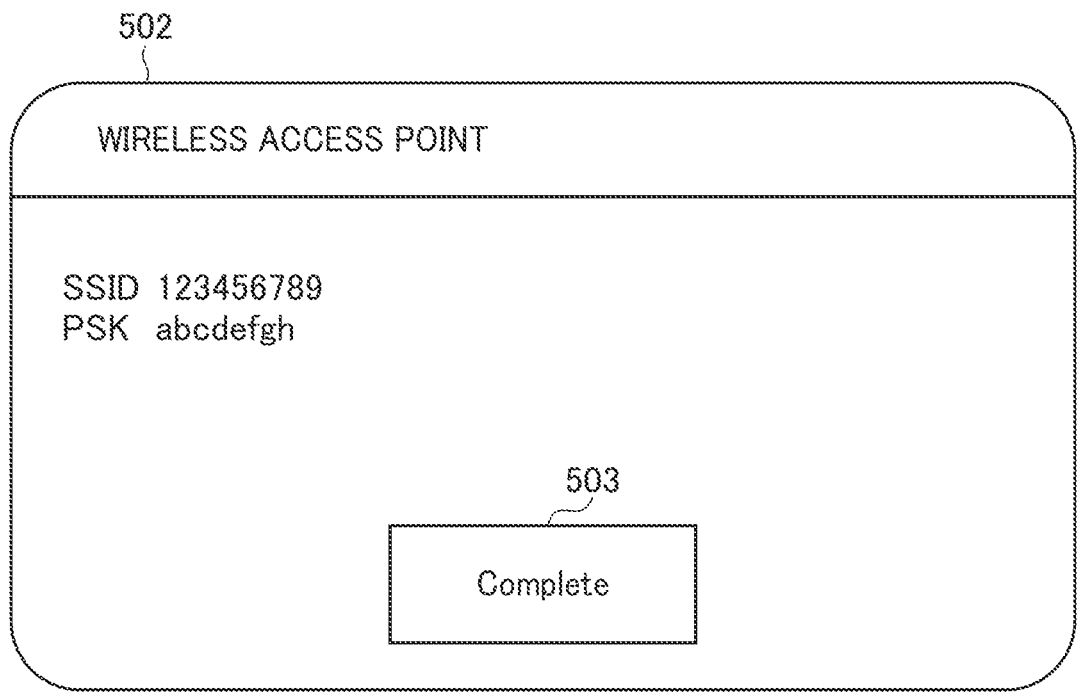
FIG. 5B is a view showing an example of a screen displayed for instructing termination of the mode.

Moreover, when a user selects the start button 501, a setting information screen 502 in FIG. 5B will be displayed on the operation unit 113. Setting information, such as an SSID and a PSK, that is needed when the client PC 109 is communicatively connected to the MFP 101 that functions as an access point is displayed in the setting information screen 502. When a user selects an end button 503 in the setting information screen 502, the end of the wireless-access-point mode is instructed to the network setting module 303. Thereby, the MFP 101 finishes the wireless direct communication with the client PC 109.

Figure 6:
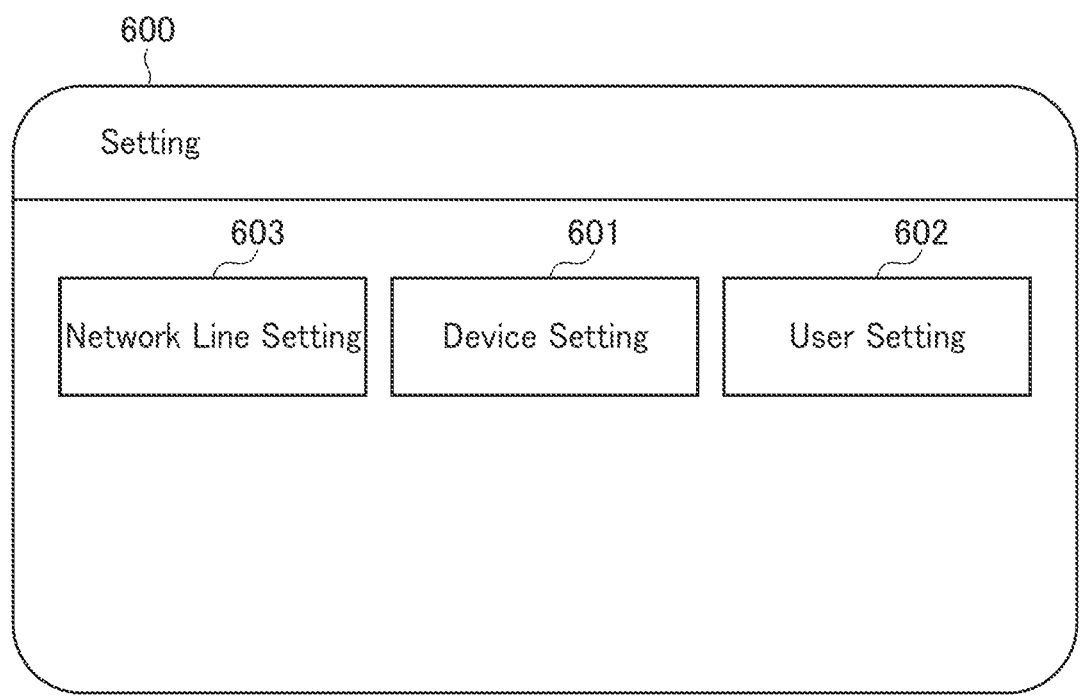
FIG. 6 is a view showing an example of a setting screen displayed on the operation unit shown in FIG. 1.

The setting screen 600 in FIG. 6 is an operation screen for guiding a user to a setting screen on which detailed information about each setting is set up and has a device setting button 601, user setting button 602, and network line setting button 603. The device setting button 601 is a manual operation button for displaying a device setting screen (not shown) for the device setting of the MFP 101. The user setting button 602 is a manual operation button for displaying a user setting screen (not shown) for the setting about the user of the MFP 101. The network line setting button 603 is a manual operation button for displaying a network setting screen 700 in FIG. 7 for the network setting of the MFP 101.

Figure 7:
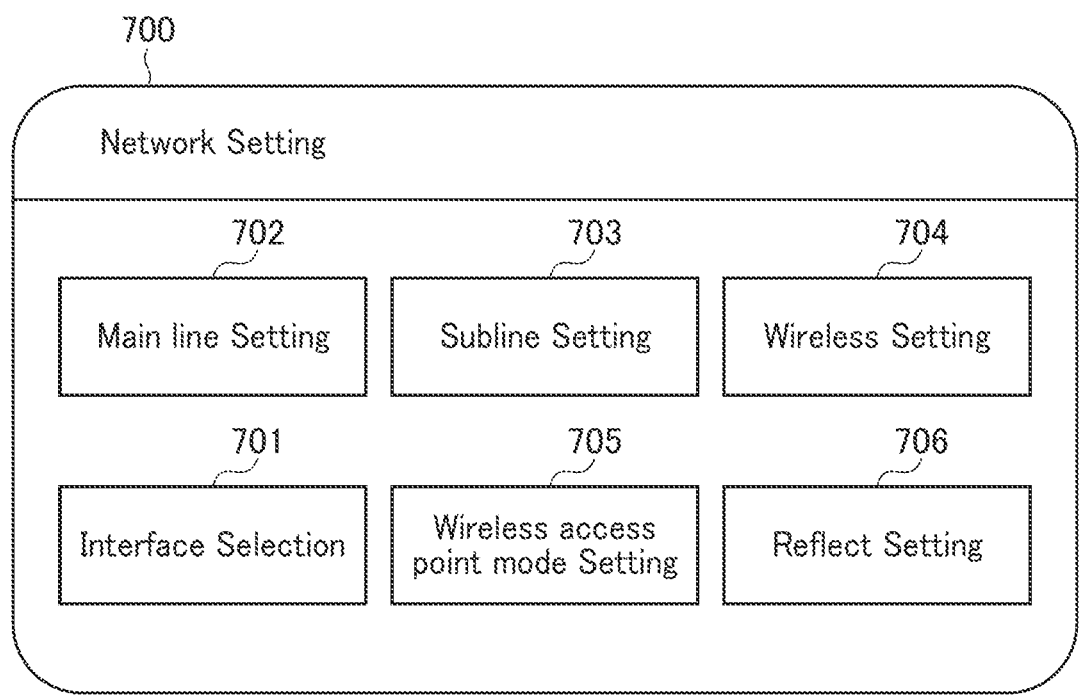
FIG. 7 is a view showing an example of a network setting screen displayed on the operation unit shown in FIG. 1.

The network setting screen 700 in FIG. 7 is an operation screen for guiding a user to a setting screen for the setting of detailed information about the network setting. The network setting screen 700 has an interface selection button 701, a main line setting button 702, a subline setting button 703, a wireless setting button 704, a wireless-access-point-mode setting button 705, and a setting reflection button 706. The interface selection button 701 is a manual operation button for displaying an interface selection screen 800 in FIG. 8 mentioned later. The main line setting button 702 is a manual operation button for displaying a main line setting screen 900 in FIG. 9 mentioned later. The subline setting button 703 is a manual operation button for displaying a subline setting screen 1000 in FIG. 10 mentioned later. The wireless setting button 704 is a manual operation button for displaying a wireless setting screen 1100 in FIG. 11 mentioned later. The wireless-access-point-mode setting button 705 is a manual operation button for displaying a wirelessaccess-point setting screen 1300 in FIG. 13 mentioned later. The setting reflection button 706 is a manual operation button for storing the setting values set by the user into the HDD 205 and for instructing to reflect the settings to the network setting module 303.

Figure 8:
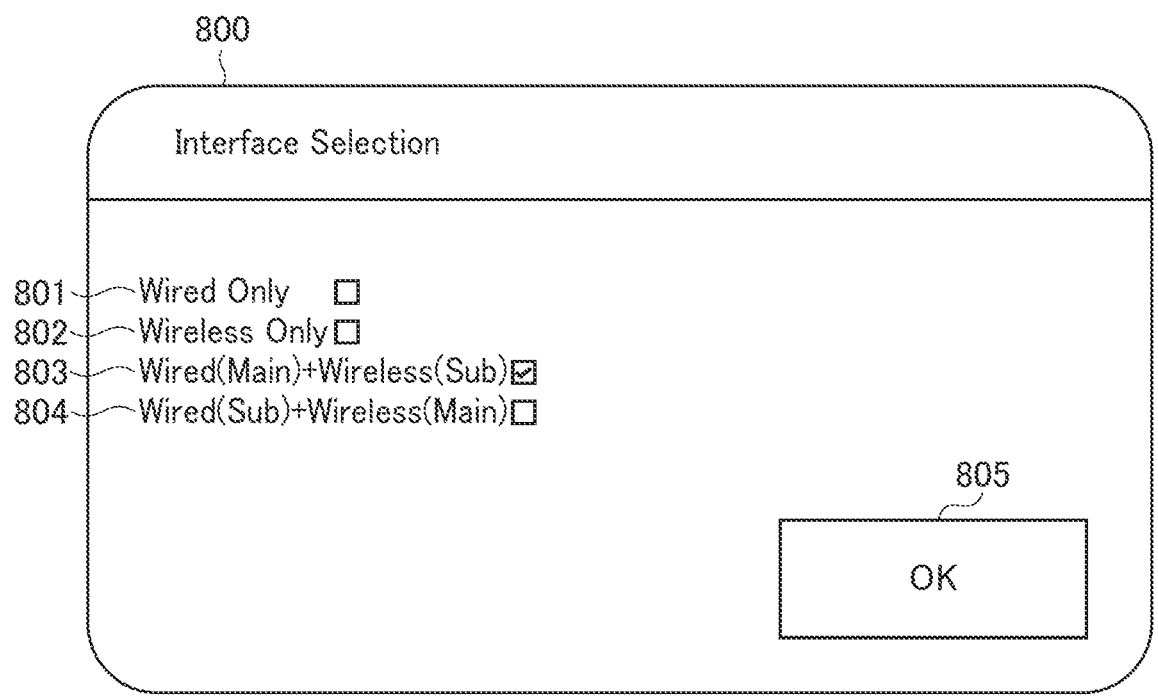
FIG. 8 is a view showing an example of an interface selection screen displayed on the operation unit shown in FIG. 1.

The interface selection screen 800 in FIG. 8 is a setting screen for setting up the wired infrastructure and wireless infrastructure in the MFP 101. When a "Wired Only" option 801 is set to ON, the MFP 101 uses the wired infrastructure only. When a "Wireless Only" option 802 is set to ON, the MFP 101 uses the wireless infrastructure only. When a "Wired (Main)+Wireless (Sub)" option 803 is set to ON, the MFP 101 uses the wired infrastructure as the main line and uses the wireless infrastructure as the subline. When a "Wired (Sub)+Wireless (Main)" option 804 is set to ON, the MFP 101 uses the wired infrastructure as the subline and uses the wireless infrastructure as the main line. An action of the main line is given priority rather than an action of the subline in the embodiment. For example, the MFP 101 may stop the action of the subline in order to give priority to the action of the main line. Moreover, the MFP 101 may partially restrict the functions of the subline by stopping a part of services provided without stopping all the actions of the subline. In the interface selection screen 800, only one option can be selected from among four options of the "Wired Only" option 801, "Wireless Only" option 802, "Wired (Main)+Wireless (Sub)" option 803, and "Wired (Sub)+Wireless (Main)" option 804. When an OK button 805 is selected, the setting value on the interface selection screen 800 is stored into the HDD 205. It should be noted that the setting about the wireless infrastructure is not associated with the setting about the wireless direct communication in the embodiment. Accordingly, the setting value on the interface selection screen 800 does not affect the setting about the wireless direct communication.

Figure 9:
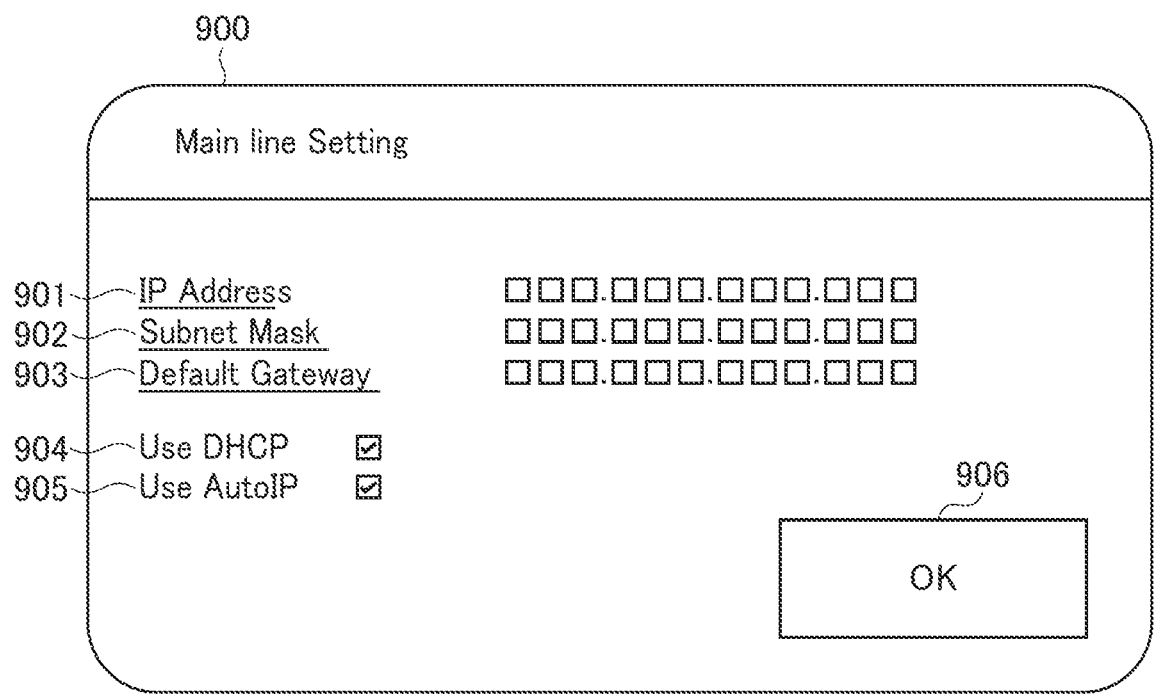
FIG. 9 is a view showing an example of a main line setting screen displayed on the operation unit shown in FIG. 1.

The main line setting screen 900 in FIG. 9 is an operation screen for setting up the address information about the main line of the MFP 101. A user is able to enter an optional IP address, subnet mask, and default gateway into an IP address entry field 901, a subnet mask entry field 902, and a default gateway entry field 903, respectively. When a DHCP option 904 is set to ON, the DHCP becomes valid in the main line, and the MFP 101 obtains the IP address set as the address information about the main line from the DHCP server on the network of the main line. When an AutoIP option 905 is set to ON, the AutoIP becomes valid in the main line, and the MFP 101 obtains the IP address set as the address information about the main line by the AutoIP. When an OK button 906 is selected, the setting values on the main line setting screen 900 are stored into the HDD 205.

Figure 10:
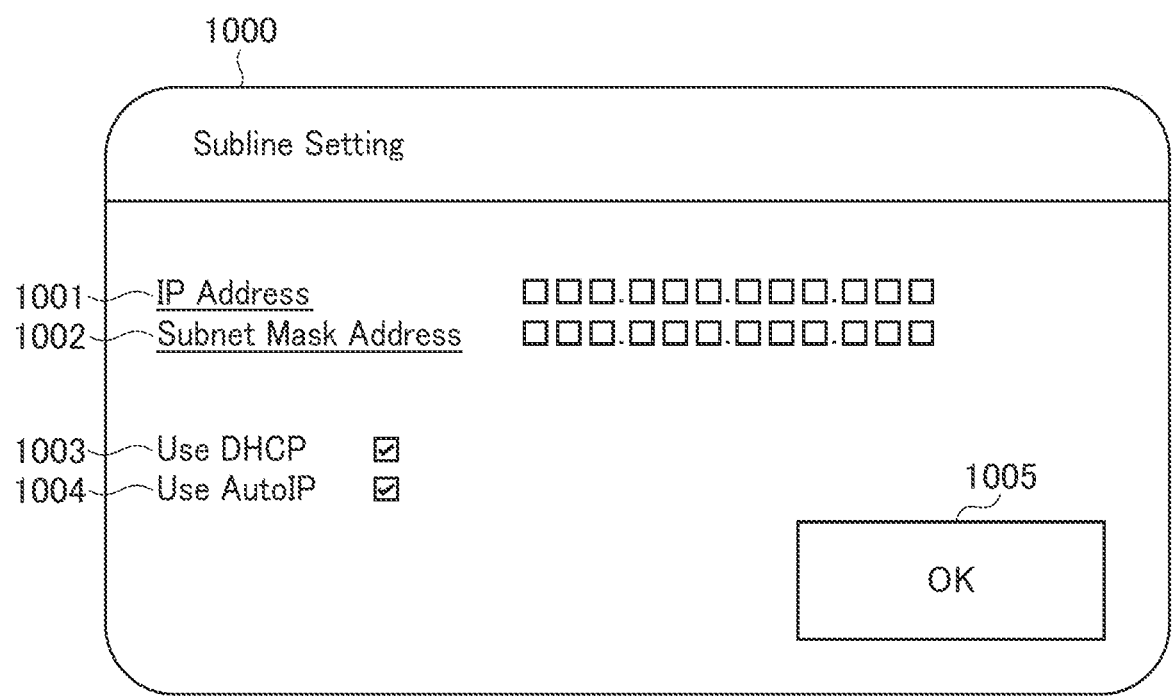
FIG. 10 is a view showing an example of a subline setting screen displayed on the operation unit in FIG. 3.

A subline setting screen 1000 in FIG. 10 is an operation screen for setting up the address information about the subline of the MFP 101. A user is able to enter an optional IP address and subnet mask into an IP address entry field 1001 and a subnet mask entry field 1002, respectively. When a DHCP option 1003 is set to ON, the DHCP becomes valid in the subline, and the MFP 101 obtains the IP address set as the address information about the subline from the DHCP server on the network of the subline. When an AutoIP option 1004 is set to ON, the AutoIP becomes valid in the subline, and the MFP 101 obtains the IP address set as the address information about the subline by the AutoIP. When an OK button 1005 is selected, the setting values on the subline setting screen 1000 are stored into the HDD 205. It should be noted that a part of functions of the subline is restricted in order to use a plurality of communication lines simultaneously in the embodiment. For example, the subline cannot use a default gateway. Accordingly, there is no setting item for using a default gateway on the subline setting screen 1000. The MFP 101 uses the subline as a communication line for communications within a preset network, for example. In the meantime, the main line is used as a communication line for communications through a plurality of networks including an external network using the default gateway besides the preset network. Moreover, the use of the functions of DNS, 802.1x, IPsec, IP filter, port filter, MAC address filter, SMB, HTTP, WebDAV, and FTP, for example, other than the default gateway is restricted in the subline in the embodiment.

Figure 11:
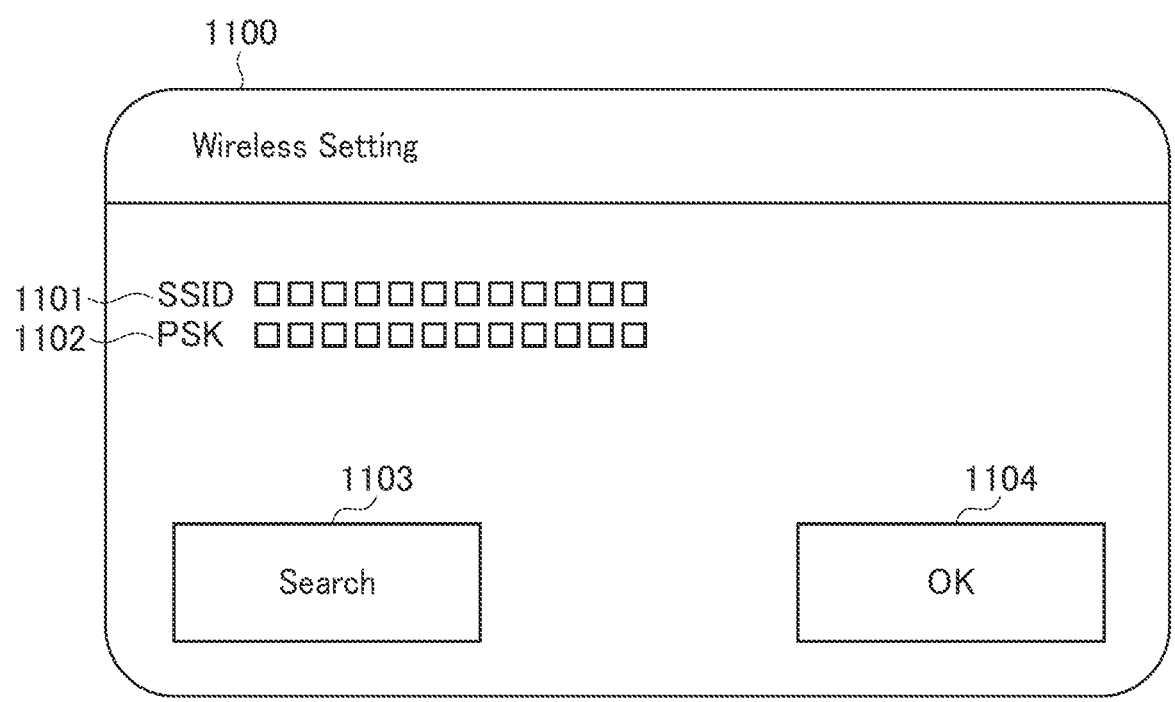
FIG. 11 is a view showing an example of a wireless setting screen displayed on the operation unit shown in FIG. 1.

The wireless setting screen 1100 in FIG. 11 is an operation screen for an authentication setting in the wireless infrastructure mode. A user is able to enter an SSID of the access point to be connected and a key corresponding to the SSID concerned into an SSID entry field 1101 and a PSK entry field 1102, respectively. When a search button 1103 is selected, an access-point selection screen 1200 in FIG. 12 for selecting an access point is displayed on the operation unit 113. When an OK button 1104 is selected, the setting values on the wireless setting screen 1100 are stored into the HDD 205.

Figure 12:
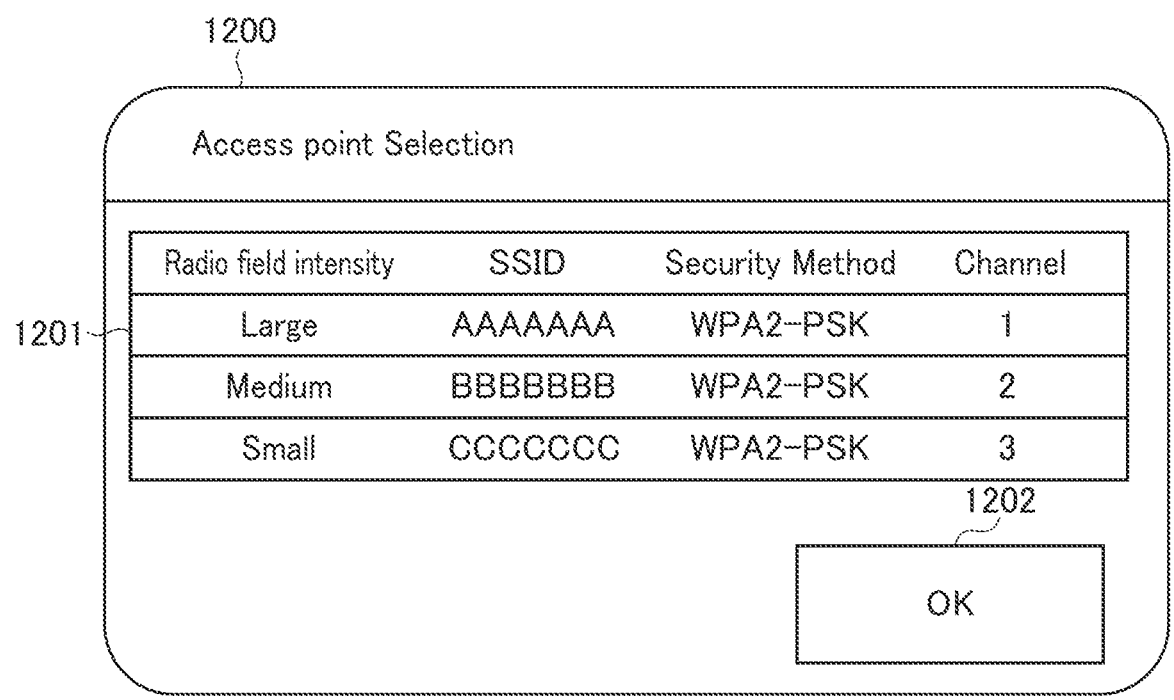
FIG. 12 is a view showing an example of an access-point selection screen displayed on the operation unit shown in FIG. 1.

The access-point selection screen 1200 in FIG. 12 is an operation screen for setting up the access point that the MFP 101 uses. A list of access points that are available to the MFP 101 is displayed in a search result display area 1201. When a user selects the access point 105 from among the access points in the list displayed in the search result display area 1201 and selects an OK button 1202, for example, the information showing the access point 105 is stored in the HDD 205. After that, the wireless setting screen 1100 in a state where the SSID of the access point 105 is set in the SSID entry field 1101 is displayed on the operation unit 113.

Figure 13:
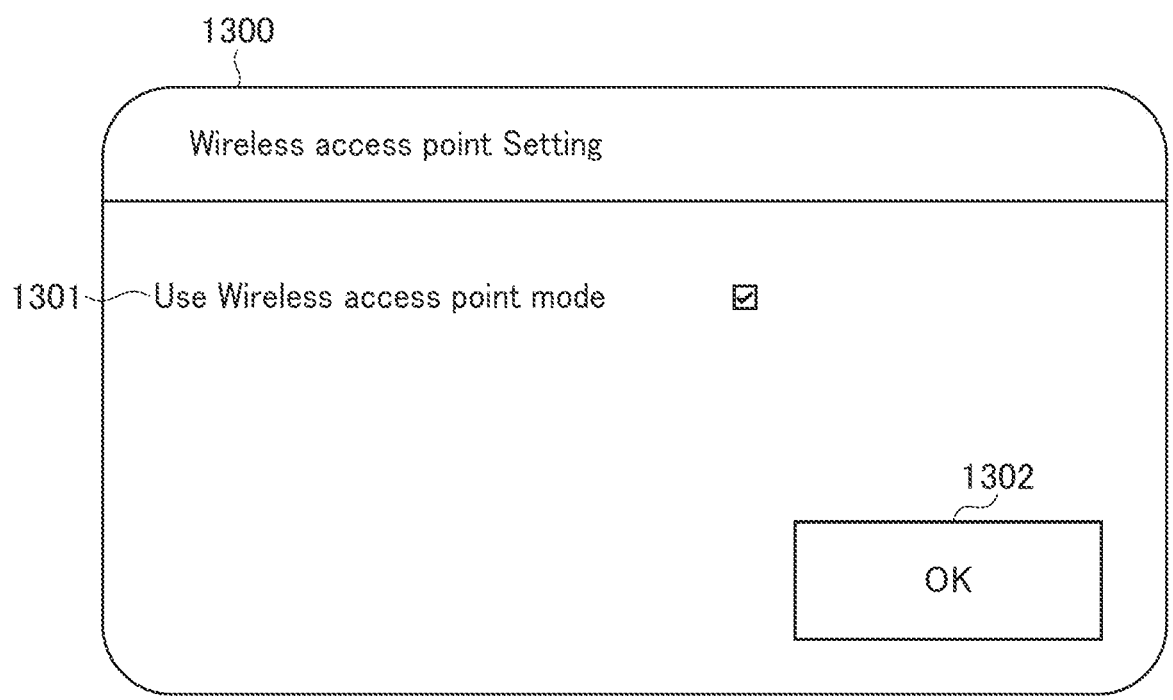
FIG. 13 is a view showing an example of a wireless access-point selection screen displayed on the operation unit in FIG. 1.

The wireless-access-point setting screen 1300 in FIG. 13 is a setting screen for setting up the wireless-access-point mode. When the wireless-access-point-mode setting 1301 is set to ON, the wireless-access-point mode of the MFP 101 becomes valid. The wireless-access-point button 405 for displaying the start setting screen 500 that is used for instructing to shift to the wireless-access-point mode is included in the menu screen 400 displayed on the operation unit 113 in a state where the wireless-access-point mode is valid. In the meantime, when the wireless-access-point-mode setting 1301 is set to OFF, the wireless-access-point mode of the MFP 101 becomes invalid. The wireless-access-point button 405 is not included in the menu screen 400 displayed on the operation unit 113 in a state where the wireless-access-point mode is invalid. When an OK button 1302 is selected, the setting value on the wireless-access-point setting screen 1300 is stored in the HDD 205, and the display on the operation unit 113 is switched to the network setting screen 700.

Figure 14:
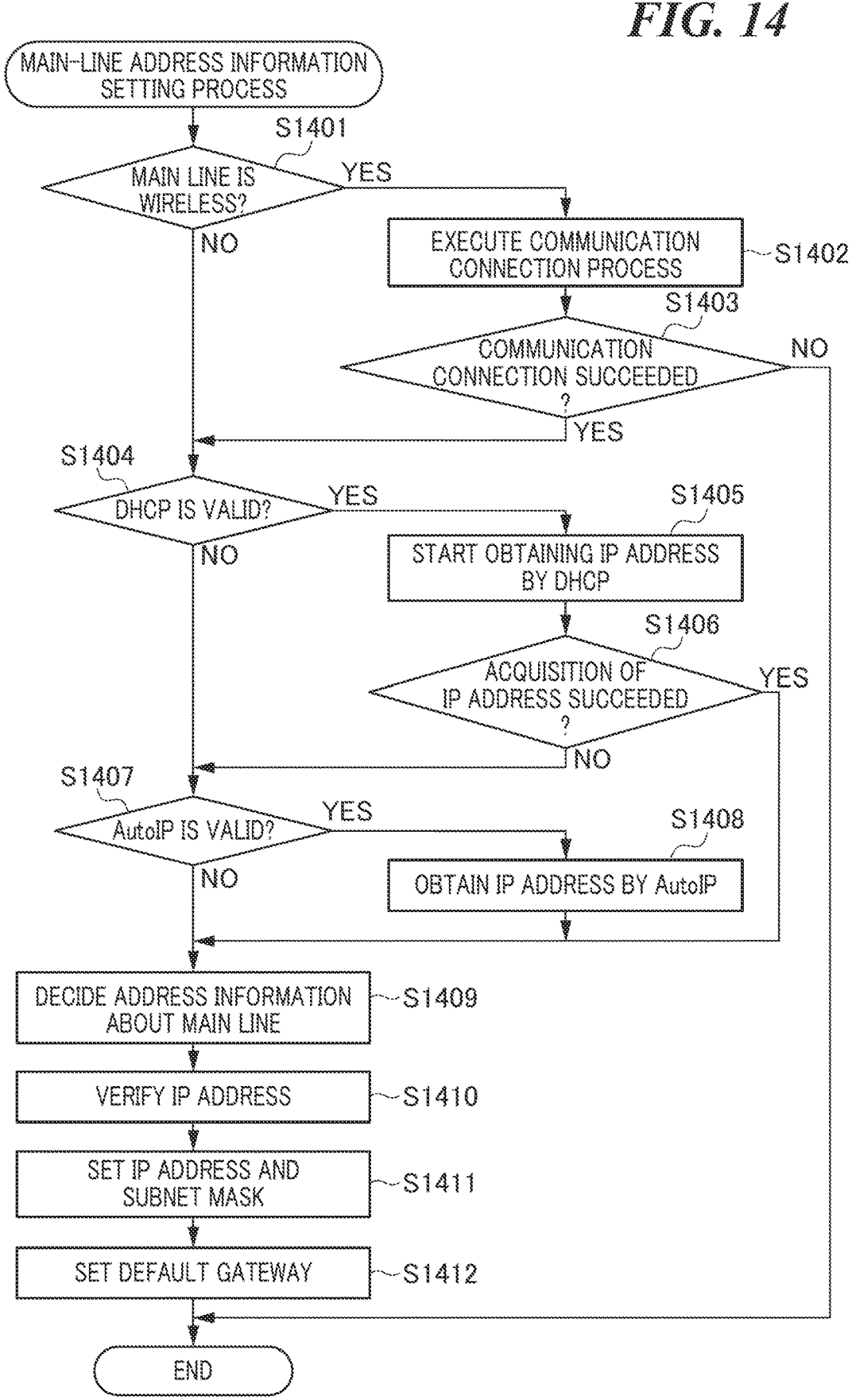
FIG. 14 is a flowchart showing procedures of a main-line address information setting process executed by a network setting module shown in FIG. 3.

Next, a process about setting of the address information about the MFP 101 will be described. FIG. 14 is a flowchart showing procedures of a main-line address information setting process executed by the network setting module 303 shown in FIG. 3. The process in FIG. 14 is performed when the CPU 201 runs the program stored in the HDD 205. The process in FIG. 14 is executed when the system of the MFP 101 starts or when the setting reflection button 706 on the network setting screen 700 is selected. Moreover, the process in FIG. 14 is premised on completion of the setting on the screens in FIG. 8, FIG. 9, and in FIG. 11 at least.

As shown in FIG. 14, the network setting module 303 determines whether the main line is wireless first (step S1401). In the step S1401, when the setting value showing the "Wireless Only" option 802 or the "Wired (Sub)+ Wireless (Main)" option 804 is stored in the HDD 205, the network setting module 303 determines that the main line is wireless. In the meantime, when the setting value showing the "Wired Only" option 801 or the "Wired (Main)+Wireless (Sub)" option 803 is stored in the HDD 205, the network setting module 303 determines that the main line is not wireless.

As a result of the determination in the step S1401, when the main line is wireless, the network setting module 303 executes the communication connection process with the access point (for example, the access point 105) set up on the wireless setting screen 1100 (step S1402). In the above-mentioned communication connection process, the network setting module 303 requests a process from the WPA control module 307. Thereby, the WPA control module 307 obtains the SSID and PSK of the access point 105 from the data memory module 302 and sends an authentication request that is generated by the obtained PSK to the access point 105. Moreover, the WPA control module 307 receives the determination result about connection propriety from the access point 105. Next, the network setting module 303 determines whether the communication connection with the access point 105 succeeded (step S1403). In the step S1403, when the above-mentioned determination result received shows that the connection is valid, the network setting module 303 determines that communication connection with the access point 105 succeeded. In the meantime, when the above-mentioned determination result received shows that the connection is invalid, the network setting module 303 determines that communication connection with the access point 105 failed.

As a result of the determination in the step S1403, when the communication connection with the access point 105 failed, the network setting module 303 finishes this process.

When the main line is not wireless as a result of the determination in the step S1401 or when the communication connection with the access point 105 succeeded as a result of the determination in the step S1403, the network setting module 303 performs a process in step S1404. In the step S1404, the network setting module 303 determines whether the DHCP is valid in the main line. In the step S1404, when the setting value showing that the DHCP option 904 is ON is stored in the HDD 205, the network setting module 303 determines that the DHCP is valid in the main line. In the meantime, when the setting value showing that the DHCP option 904 is OFF is stored in the HDD 205, the network setting module 303 determines that the DHCP is invalid in the main line.

As a result of the determination in the step S1404, when the DHCP is valid in the main line, the network setting module 303 starts obtaining the IP address by the DHCP (step S1405). In the step S1405, the network setting module 303 requests a process from the DHCP control module 304. Thereby, the DHCP control module 304 searches for a DHCP server on the network of the main line of the MFP 101 according to the DHCP protocol. The DHCP control module 304 obtains the IP address allocated by the DHCP server searched and registers use of the obtained IP address to the above-mentioned DHCP server. Next, the network setting module 303 determines whether acquisition of the IP address by the DHCP succeeded (step S1406).

When the DHCP is invalid in the main line as a result of the determination in the step S1404 or when the acquisition of the IP address by the DHCP failed as a result of the determination in the step S1406, the network setting module 303 performs a process in step S1407. In the step S1407, the network setting module 303 determines whether the AutoIP is valid in the main line. In the step S1407, when the setting value showing that the AutoIP option 905 is ON is stored in the HDD 205, the network setting module 303 determines that the AutoIP is valid in the main line. In the meantime, when the setting value showing that the AutoIP option 905 is OFF is stored in the HDD 205, the network setting module 303 determines that the AutoIP is invalid in the main line.

When the acquisition of the IP address by the DHCP succeeded as a result of the determination in the step S1406 or when the AutoIP is invalid in the main line as a result of the determination in the step S1407, the network setting module 303 performs a process in step S1409 mentioned later.

As a result of the determination in the step S1407, when the AutoIP is valid in the main line, the network setting module 303 obtains the IP address by the AutoIP (step S1408). In the step S1408, the network setting module 303 executes a selection process to select one IP address at random from among IP addresses within an IP address range prescribed for the AutoIP. Moreover, the network setting module 303 executes a confirming process to confirm by an ARP protocol that there is no communication device to which the above-mentioned IP address is assigned on the network of the main line. When there is a communication device to which the above-mentioned IP address is assigned on the network of the main line, the network setting module 303 repeatedly executes the selection process and confirming process until an IP address that is used by no communication devices on the network of the main line is found. Next, the network setting module 303 decides the address information about the main line of the MFP 101 (step S1409).

For example, when the acquisition of the IP address from the DHCP server succeeded, the network setting module 303 decides the IP address obtained from the DHCP server and the subnet mask and default gateway that correspond to the IP address concerned, as the address information about the main line. Moreover, when the acquisition of the IP address from the DHCP server failed or when the DHCP is invalid in the main line, the network setting module 303 obtains the IP address by the AutoIP. In such cases, the network setting module 303 decides the IP address obtained by the AutoIP, the subnet mask of the IP address, and the default gateway as the address information about the main line. When the acquisition of the IP address from the DHCP server failed and when the AutoIP is invalid in the main line, the network setting module 303 decides an invalid address (for example, (0.0.0.0)) as the address information about the main line. When both the DHCP and AutoIP are invalid in the main line, the network setting module 303 decides the entered values to the IP address entry field 901, the subnet mask entry field 902, and the default gateway entry field 903 as the address information about the main line.

Next, the network setting module 303 verifies the IP address in the decided address information (step S1410). When the above-mentioned IP address is an invalid address as a result of the verification, a message to prompt a user to check the IP address is displayed on the operation unit 113. Next, the network setting module 303 sets the IP address and subnet mask in the decided address information to the TCP/IP control module 306 (step S1411). Next, the network setting module 303 sets the default gateway in the decided address information to the TCP/IP control module 306 (step S1412), and finishes this process.

This enables data communication between the MFP 101 and the communication device connected to the network of the main line using the set-up address information about the main line. When performing the data communication with the communication device connected to the network of the main line, the MFP 101 specifies the main line of the same network as the above-mentioned communication device from among the main line and subline on the basis of the network addresses of the communication lines specified from the respective IP addresses of the main line and subline. The MFP 101 decides the specified main line as the communication line that is used for the data communication with the above-mentioned communication device.

An IP address allocated by the AutoIP is constituted on the basis of the predetermined network address "169.254.1.0" reserved by RFC3927. Accordingly, when the IP addresses allocated by the AutoIP are set to both the main line and sublines, the network addresses of the communication lines overlap, and the communication line that the MFP 101 uses at the time of data communication with the communication device cannot be decided. Against this, the conventional technique allows to use the AutoIP to the main line only among the main line and subline. However, when the use of the AutoIP is allowed to the main line only, the AutoIP cannot be used for the subline even if the network addresses do not overlap. Accordingly, if the acquisition of the IP address from a second allocation function (for example, the DHCP server) other than the AutoIP failed in the setting of the IP address of the subline, a suitable IP address that does not overlap with other communication devices cannot be set to the subline.

In light of this problem, it is decided whether the AutoIP is used for setting the address information about the subline according to a use situation of the AutoIP in the setting of the address information about the main line in the embodiment.

Figure 15:
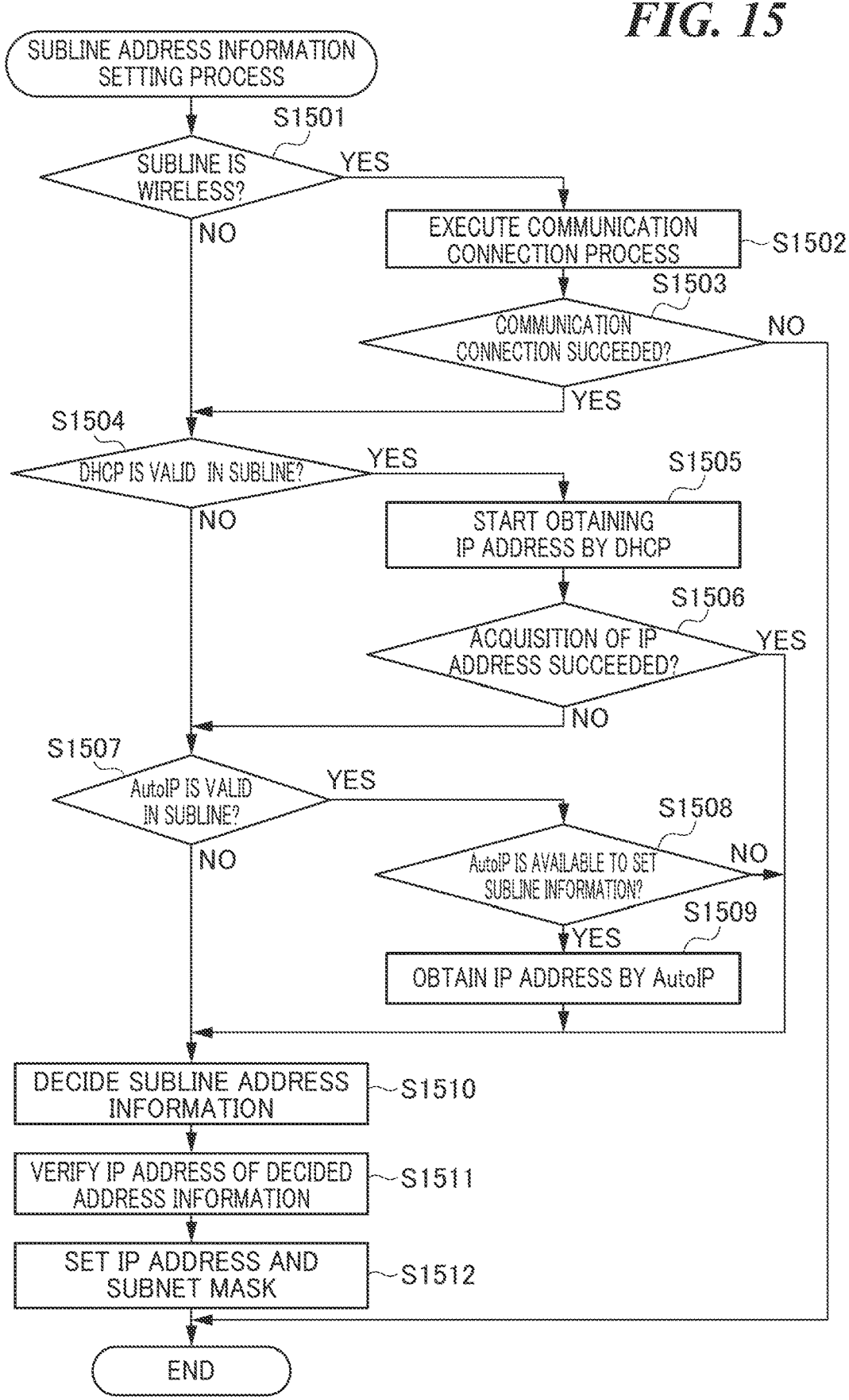
FIG. 15 is a flowchart showing procedures of a subline address information setting process executed by the network setting module shown in FIG. 3.

FIG. 15 is a flowchart showing procedures of a subline address information setting process executed by the network setting module 303 shown in FIG. 3.

The process in FIG. 15 is executed when the CPU 201 runs the program stored in the HDD 205. Moreover, the process in FIG. 15 is executed after finishing the process in FIG. 14 and is premised on completion of the settings on the screens in FIG. 8 through FIG. 11 at least.

As shown in FIG. 15, the network setting module 303 determines whether the subline is wireless on the basis of the setting value stored in the HDD 205 (step S1501).

As a result of the determination in the step S1501, when the subline is wireless, the network setting module 303 executes the communication connection process with the access point (for example, the access point 105) set up on the wireless setting screen 1100 (step S1502). In the above-mentioned communication connection process, the network setting module 303 requests a process from the WPA control module 307 and the process similar to the step S1402 is performed. Next, the network setting module 303 determines whether the communication connection with the access point 105 succeeded (step S1503).

As a result of the determination in the step S1503, when the communication connection with the access point 105 failed, the network setting module 303 finishes this process.

When the subline is not wireless as a result of the determination in the step S1501 or when the communication connection with the access point 105 succeeded as a result of the determination in the step S1503, the network setting module 303 performs a process in step S1504. In the step S1504, the network setting module 303 determines whether the DHCP is valid in the subline. In the step S1504, when the setting value showing that the DHCP option 1003 is ON is stored in the HDD 205, the network setting module 303 determines that the DHCP is valid in the subline. In the meantime, when the setting value showing that the DHCP option 1003 is OFF is stored in the HDD 205, the network setting module 303 determines that the DHCP is invalid in the subline.

As a result of the determination in the step S1504, when the DHCP is valid in the subline, the network setting module 303 starts obtaining the IP address by the DHCP (step S1505). In the step S1505, the network setting module 303 requests a process from the DHCP control module 304. Thereby, the DHCP control module 304 searches for a DHCP server on the network of the subline of the MFP 101 according to the DHCP protocol. The DHCP control module 304 obtains the IP address allocated by the DHCP server searched and registers use of the obtained IP address to the above-mentioned DHCP server. Next, the network setting module 303 determines whether acquisition of the IP address by the DHCP succeeded (step S1506).

As a result of the determination in the step S1506, when the acquisition of the IP address by the DHCP succeeded, the network setting module 303 executes a process in step S1510 mentioned later.

When the DHCP is invalid in the subline as a result of the determination in the step S1504 or when the acquisition of the IP address by the DHCP failed as a result of the determination in the step S1506, the network setting module 303 performs a process in step S1507. In the step S1507, the network setting module 303 determines whether the AutoIP is valid in the subline. In the step S1507, when the setting value showing that the AutoIP option 1004 is ON is stored in the HDD 205, the network setting module 303 determines that the AutoIP is valid in the subline. In the meantime, when the setting value showing that the AutoIP option 1004 is OFF is stored in the HDD 205, the network setting module 303 determines that the AutoIP is invalid in the subline.

As a result of the determination in the step S1507, when the AutoIP is valid in the subline, the network setting module 303 determines whether the AutoIP is available to set the address information about the subline (step S1508). In the step S1508, when the IP address obtained by the AutoIP is not set in the address information about the main line in the process in FIG. 14, it is determined that the AutoIP is available to set the address information about the subline. In the meantime, when the IP address obtained by the AutoIP is set in the address information about the main line in the process in FIG. 14, it is determined that the AutoIP is unavailable to set the address information about the subline. That is, it is decided whether the AutoIP is used for setting the address information about the subline according to the use situation of the AutoIP in the setting of the address information about the main line in the embodiment.

As a result of the determination in the step S1508, when the AutoIP is available to set the address information about the subline, the network module 303 obtains the IP address by the AutoIP (step S1509). In the step S1509, the network setting module 303 executes the selection process to select one IP address at random from among IP addresses within an IP address range prescribed for the AutoIP. Moreover, the network setting module 303 executes the confirming process to confirm by the ARP protocol that there is no communication device to which the above-mentioned IP address is assigned on the network of the subline. When there is a communication device to which the above-mentioned IP address is assigned on the network of the subline, the network setting module 303 repeatedly executes the selection process and confirming process until an IP address that is used by no communication devices on the network of the subline is found. Next, the network setting module 303 executes a process in step S1510 mentioned later.

When the AutoIP is invalid in the subline as a result of the determination in the step S1507 or when the AutoIP is unavailable to set the address information about the subline as a result of the determination in the step S1508, the processing in the step S1510 is performed. In the step S1510, the network setting module 303 decides the address information about the subline of the MFP 101.

For example, when acquisition of an IP address from the DHCP server succeeded, the network setting module 303 decides the IP address obtained from the DHCP server, the subnet mask corresponding to the IP address concerned, and the default gateway as the address information about the subline. Moreover, when the acquisition of the IP address from the DHCP server failed or when the DHCP is invalid in the subline, the network setting module 303 obtains the IP address by the AutoIP. In such cases, the network setting module 303 decides the IP address obtained by the AutoIP, the subnet mask of the IP address, and the default gateway as the address information about the subline. When the acquisition of the IP address from the DHCP server failed and the AutoIP is invalid in the subline, or when the AutoIP is unavailable to set the address information about the subline, the network setting module 303 decides an invalid address as the address information about the subline. When both the DHCP and AutoIP are invalid in the subline, the network setting module 303 decides the entered values to the IP address entry field 901, the subnet mask entry field 902, and the default gateway entry field 903 as the address information about the subline.

Next, the network setting module 303 verifies the IP address in the decided address information (step S1511). When the above-mentioned IP address is an invalid address as a result of the verification, a message to prompt a user to check the IP address is displayed on the operation unit 113. Next, the network setting module 303 sets the IP address and subnet mask in the decided address information to the TCP/IP control module 306 (step S1512) and finishes this process.

Figure 16:
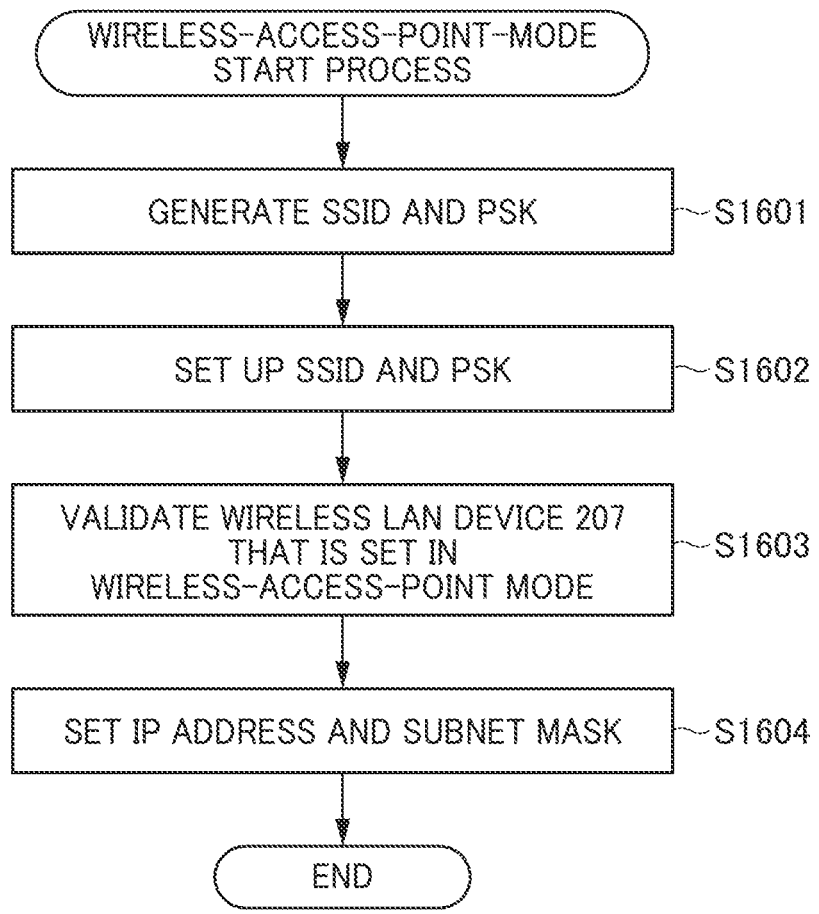
FIG. 16 is a flowchart showing procedures of a wireless-access-point-mode start process executed by the network setting module shown in FIG. 3.

FIG. 16 is a flowchart showing procedures of a wireless-access-point-mode start process executed by the network setting module 303 shown in FIG. 3.

The process in FIG. 16 is executed by the CPU 201 that runs the program stored in the HDD 205 when a user selects the start button 501 on the start setting screen 500. The process in FIG. 16 is premised on the advance allocation of the address information (specifically, the IP address and the subnet mask) in the wireless-access-point mode.

As shown in FIG. 16, the network setting module 303 requests the WPA control module 307 to generate an SSID and a PSK of the MFP 101 as an access point (step S1601). Next, the network setting module 303 requests the WPA control module 307 to set up the above-mentioned SSID and PSK (step S1602). Next, the network setting module 303 requests the WPA control module 307 to validate the wireless LAN device 207 that is set in the wireless-access-point mode (step S1603). Next, the network setting module 303 sets up the address information in the wireless-access-point mode. Specifically, the network setting module 303 sets the IP address and subnet mask in the address information in the wireless-access-point mode to the TCP/IP control module 306 (step S1604). Thereby, the wireless direct communication of the MFP 101 becomes available. After that, the network setting module 303 finishes this process.

Figure 17:
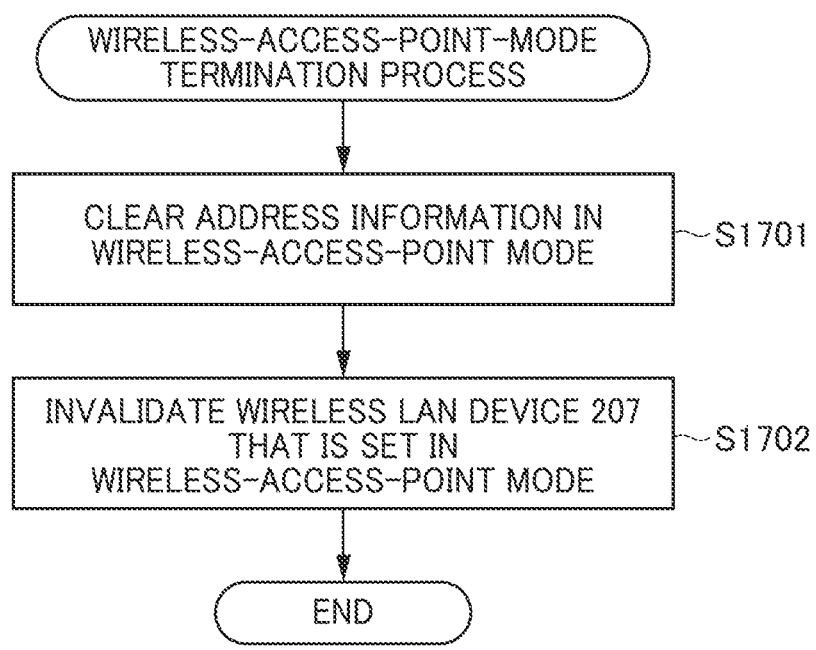
FIG. 17 is a flowchart showing procedures of a wireless-access-point-mode termination process executed by the network setting module shown in FIG. 3.

FIG. 17 is a flowchart showing procedures of a wireless-access-point-mode termination process executed by the network setting module 303 shown in FIG. 3.

The process in FIG. 17 is executed when the CPU 201 runs the program stored in the HDD 205. Moreover, the process in FIG. 17 is executed when a user selects the end button 503 on the setting information screen 502 in the case where the MFP 101 is in the wireless-access-point mode.

As shown in FIG. 17, the network setting module 303 clears the set-up address information (specifically, the IP address and subnet mask) in the wireless-access-point mode (step S1701). Next, the network setting module 303 requests the WPA control module 307 to invalidate the wireless LAN device 207 set in the wireless-access-point mode repealed (step S1702). After that, the network setting module 303 finishes this process.

According to the above-mentioned embodiment, it is decided whether the AutoIP is used for setting the address information about the subline according to the use situation of the AutoIP in the setting of the address information about the main line in the embodiment. This enables to set up the IP address that does not overlap with other communication devices using the AutoIP as the address information about the subline, which enables to set up the suitable IP address for the subline.

Moreover, in the above-mentioned embodiment, when the IP address allocated by the AutoIP is not set to the address information about the main line, the AutoIP is used for setting the address information about the subline. This prevents the setting of an unsuitable IP address that consists of the same network address as the main line to the subline.

Furthermore, in the above-mentioned embodiment, when the acquisition of the IP address allocated by the DHCP server in the setting of the address information about the subline failed, the AutoIP is used for setting the address information about the subline. Accordingly, even if the acquisition of the IP address allocated by the DHCP server in the setting of the address information about the subline failed, the suitable IP address for a subline can be set up.

In the above-mentioned embodiment, the MFP 101 is an image forming apparatus that sends image data to which an image forming process has been applied using communication lines. Thereby, when the image data is sent to a transmission destination, a suitable communication line is selected from among the main line and subline and is used.

Although the present invention is described with the embodiment mentioned above, the present invention is not limited to the embodiment mentioned above. For example, when the AutoIP is valid in the main line, it may be controlled so as not to receive a user's instruction to validate the AutoIP in the subline.

FIG. 18 is a flowchart showing procedures of a screen control process executed by the operation control module 301 in FIG. 3.

The process in FIG. 18 is executed when the CPU 201 runs the program stored in the HDD 205. Moreover, the process in FIG. 18 is executed when a user's instruction to validate the AutoIP in the main line is received (specifically, when the AutoIP option 905 is set to ON on the main line setting screen 900).

As shown in FIG. 18, the operation control module 301 determines whether use of plural communication lines is set up (step S1801). In the step S1801, when the setting value showing the "Wired (Main)+Wireless (Sub)" option 803 or the "Wired (Sub)+Wireless (Main)" option 804 is stored in the HDD 205, the operation control module 301 determines that the use of the plural communication lines is set up. In the meantime, when the setting value showing the "Wired Only" option 801 or the "Wireless Only" option 802 is stored in the HDD 205, the operation control module 301 determines that the use of the plural communication lines is not set up.

As a result of the determination in the step S1801, when the use of the plural communication lines is not set up, the operation control module 301 finishes this process. In the meantime, as a result of the determination in the step S1801, when the use of the plural communication lines is set up, the operation control module 301 determines whether the AutoIP is valid in the subline (step S1802). In the step S1802, when the setting value showing that the AutoIP option 1004 is ON is stored in the HDD 205, the operation control module 301 determines that the AutoIP is valid in the subline. In the meantime, when the setting value showing that the AutoIP option 1004 is OFF is stored in the HDD 205, the operation control module 301 determines that the AutoIP is invalid in the subline.

As a result of the determination in the step S1802, when the AutoIP is invalid in the subline, the operation control module 301 performs a process in step S1804 mentioned later.

As a result of the determination in the step S1802, when the AutoIP is valid in the subline, the operation control module 301 invalidates the AutoIP in the subline (step S1803). Specifically, the operation control module 301 changes the setting value showing that the AutoIP option 1004 is ON stored in the HDD 205 to the setting value showing that the AutoIP option 1004 is OFF. Next, the operation control module 301 controls so as not to receive a user's instruction that validates the AutoIP in the subline. Specifically, the operation control module 301 displays the AutoIP option 1004 in gray or does not display the option 1004 on the subline setting screen 1000 so that a user cannot select the AutoIP option 1004 (step S1804). After that, the operation control module 301 finishes this process.

In the process in the FIG. 18 mentioned above, when the AutoIP is valid in the main line, the MFP 101 controls so as not to receive a user's instruction to validate the AutoIP in the subline. This prevents the setting of an unsuitable IP address to the subline resulting from a user's instruction.

In the above-mentioned embodiment, a pop-up window showing that the AutoIP option 1004 cannot be selected may be displayed on the operation unit 113. This inhibits a user from selecting the AutoIP option 1004 in a case where an unsuitable IP address may be set because the AutoIP is validated in the subline.

It should be noted that the main line may be called as a primary line or a priority line and the subline may be called as a secondary line or an auxiliary line in the above-mentioned embodiment.

Moreover, a communication line may be called as an infrastructure in the above-mentioned embodiment.

Furthermore, although the plurality of communication lines are achieved by the plurality of physically different network interfaces in the above-mentioned embodiment, the plurality of logical lines may be achieved by a single network interface.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-236268, filed Dec. 8, 2017, which is hereby incorporated by reference herein in its entirety.

What is claimed is:

1. An information processing apparatus that uses a plurality of network interfaces, the information processing apparatus comprising:
　at least one memory that stores instructions; and
　at least one processor that executes the instructions, the instructions, when executed, causing the information processing apparatus to:
　in a condition where an IP address is assigned to a first network interface among the plurality of network interfaces by using a first allocation method, prevent a use of the first allocation method to assign an IP address to other network interfaces of the plurality of network interfaces; and
　when assigning an IP address to one of the plurality of network interfaces in a condition where an IP address is assigned to none of the plurality of network interfaces by using the first allocation method, allow a use of the first allocation method to assign an IP address to the one of the plurality of network interfaces.

2. The information processing apparatus according to claim 1, wherein the at least one memory further stores instructions that, when executed by the at least one processor, cause the information processing apparatus to determine whether or not an IP address assigned to any one of the plurality of network interfaces is an IP address assigned by using the first allocation method.

3. The information processing apparatus according to claim 1, wherein the first allocation method is an allocation method to be used when assigning of an IP address to one of the plurality of network interfaces by using a second allocation method based on a DHCP fails.

4. The information processing apparatus according to claim 1, wherein the at least one memory further stores instructions that, when executed by the at least one processor, cause the information processing apparatus to control so as not to receive a user's instruction to use the first allocation method for assigning an IP address to the other network interfaces of the plurality of network interfaces, in the condition where an IP address is assigned to the first network interface by using the first allocation method.

5. The information processing apparatus according to claim 1, wherein the first allocation method is AutoIP.

6. The information processing apparatus according to claim 1, wherein the at least one memory further stores instructions that, when executed by the at least one processor, cause the information processing apparatus to transmit image data to an external apparatus through at least one of the plurality of the network interfaces.

7. A control method for an information processing apparatus that uses a plurality of network interfaces, the control method comprising:
    preventing, in a condition where an IP address is assigned to a first network interface among the plurality of network interfaces by using a first allocation method, a use of the first allocation method to assign an IP address to other network interfaces of the plurality of network interfaces; and
    allowing, when assigning an IP address to one of the plurality of network interfaces in a condition where an IP address is assigned to none of the plurality of network interfaces by using the first allocation method, a use of the first allocation method to assign an IP address to the one of the plurality of network interfaces.

8. A non-transitory computer-readable storage medium storing a control program causing a computer to execute a control method for an information processing apparatus that uses a plurality of network interfaces, the control method comprising:
    preventing, in a condition where an IP address is assigned to a first network interface among the plurality of network interfaces by using a first allocation method, a use of the first allocation method to assign an IP address to other network interfaces of the plurality of network interfaces; and
    allowing, when assigning an IP address to one of the plurality of network interfaces in a condition where an IP address is assigned to none of the plurality of network interfaces by using the first allocation method, a use of the first allocation method to assign an IP address to the one of the plurality of network interfaces.

* * * * *